(12) United States Patent
Seberger

(10) Patent No.: US 9,318,891 B2
(45) Date of Patent: Apr. 19, 2016

(54) CONTROL SIGNAL PROTECTION DEVICE

(71) Applicant: FISHER CONTROLS INTERNATIONAL LLC, Marshalltown, IA (US)

(72) Inventor: Stephen G. Seberger, Marshalltown, IA (US)

(73) Assignee: FISHER CONTROLS INTERNATIONAL LLC, Marshaltown, IA (US)

(*) Notice: Subject to any disclaimer, the term of this patent is extended or adjusted under 35 U.S.C. 154(b) by 256 days.

(21) Appl. No.: 13/964,730

(22) Filed: Aug. 12, 2013

(65) Prior Publication Data

US 2014/0049868 A1 Feb. 20, 2014

Related U.S. Application Data

(60) Provisional application No. 61/683,089, filed on Aug. 14, 2012.

(51) Int. Cl.
*H02J 9/00* (2006.01)
*H02H 9/02* (2006.01)
(Continued)

(52) U.S. Cl.
CPC ............ *H02H 9/02* (2013.01); *G05B 19/0425* (2013.01); *G06F 11/2017* (2013.01); *G05B 2219/24141* (2013.01); *G05B 2219/24197* (2013.01); *Y10T 307/625* (2015.04)

(58) Field of Classification Search
CPC ..... G05B 7/02; H04J 2203/006; H04L 69/40; H02J 9/04; H02H 9/02; H02H 3/12; Y10T 307/625; Y10T 307/505
USPC .............................. 361/79, 86, 87; 307/48, 66
See application file for complete search history.

(56) References Cited

U.S. PATENT DOCUMENTS 5,184,122 A * 2/1993 Decious .................. G05B 7/02
165/265
8,253,277 B2 * 8/2012 Lin ......................... H02J 1/108
307/43

(Continued)

FOREIGN PATENT DOCUMENTS

WO WO-99/41830 A1 8/1999

OTHER PUBLICATIONS

International Search Report and Written Opinion for PCT/US2013/054706, mailed Nov. 21, 2013.
(Continued)

*Primary Examiner* — Stephen W Jackson
*Assistant Examiner* — Christopher Clark
(74) *Attorney, Agent, or Firm* — Marshall, Gerstein & Borun LLP

(57) ABSTRACT

A control signal protection device having a first operational mode and a second operational mode includes a first terminal pair that connects the signal protection device to a control system and a second terminal pair that connects the converter to a field device. The control system provided a control signal to the control system protection device. The control signal device further includes a power storing element for temporary accumulation of electric energy and a switching circuit for controlling operational mode of the signal protection device. Electric energy is stored in the power storing element in the first operational mode. Electric energy stored in the power storing element is supplied to a positive terminal in the second terminal pair in the second operational mode.

18 Claims, 3 Drawing Sheets

(51) Int. Cl.
*G05B 19/042* (2006.01)
*G06F 11/20* (2006.01)

(56) References Cited

U.S. PATENT DOCUMENTS

| | | | | |
|---|---|---|---|---|
| 8,332,567 | B2* | 12/2012 | Burr | G05B 19/042 710/25 |
| 8,427,108 | B2* | 4/2013 | Swenson | H02J 7/34 307/48 |
| 8,762,618 | B2* | 6/2014 | Burr | G05B 19/042 251/129.01 |
| 8,780,695 | B2* | 7/2014 | Grosso | 370/217 |
| 2002/0083364 | A1 | 6/2002 | Christensen et al. | |
| 2002/0179720 | A1* | 12/2002 | Liva | H04M 3/08 235/492 |
| 2002/0184410 | A1 | 12/2002 | Apel et al. | |
| 2006/0233204 | A1* | 10/2006 | Pomaranski | G06F 11/2005 370/535 |
| 2007/0076341 | A1 | 4/2007 | Lee et al. | |
| 2007/0083275 | A1* | 4/2007 | Law | G05B 19/41855 700/19 |
| 2008/0019264 | A1* | 1/2008 | Lafleur | H04L 12/5601 370/217 |
| 2008/0126665 | A1* | 5/2008 | Burr | G05B 19/042 710/316 |
| 2009/0077275 | A1* | 3/2009 | Zhang | G06F 11/2007 710/38 |
| 2010/0185857 | A1* | 7/2010 | Neitzel | G05B 19/0428 713/168 |
| 2012/0043938 | A1* | 2/2012 | Swenson | H02J 7/34 320/128 |
| 2013/0057071 | A1* | 3/2013 | Babula | H02J 7/34 307/48 |
| 2015/0051716 | A1* | 2/2015 | Seberger | G05B 9/02 700/22 |

OTHER PUBLICATIONS

International Search Report and Written Opinion for PCT/US2013/055022, mailed Nov. 21, 2013.
International Preliminary Report on Patentability for PCT/US2013/054706, mailed Feb. 26, 2015.
International Preliminary Report on Patentability for PCT/US2013/055022, mailed Feb. 26, 2015.

* cited by examiner

CONTROL SIGNAL PROTECTION DEVICE

FIELD OF THE INVENTION

The present invention relates generally to control signals for controlling field devices in a process control system, more particularly, to a method and apparatus for preserving control signals.

DESCRIPTION OF THE RELATED ART

Process control systems, such as those used in chemical, petroleum and other processes, generally include one or more centralized or decentralized process controllers communicatively coupled to at least one host workstation, and to one or more process control and instrumentation devices, via analog, digital, or combined analog/digital buses. Field devices such as valves, valve positioners, switches, transmitters, and sensors (e.g., temperature, pressure, or flow rate sensors) perform various functions within the process, such as opening or closing valves or measuring process parameters. The process controller receives (via the communication buses) signals indicative of process measurements or process variables made by or associated with the field devices, implements a control routine based on the received information, and generates control signals which are sent over one or more of the buses to the field devices to control the operation of the process. Information from the field devices and the controller is typically made available to one or more applications executed by a host workstation to enable an operator to perform desired functions with respect to the process, such as viewing the current state of the process, modifying the operation of the process, etc.

"Smart" field devices that perform one or more process control functions have become prevalent in the process control industry. In addition to performing a primary function within the process (e.g., monitoring a temperature or controlling a valve position), each smart field device includes a memory and a microprocessor. The memory stores data pertaining to the device, and the microprocessor communicates with the controller and/or other devices, and/or performs secondary tasks such as self-calibration, identification, diagnostics, etc. A number of standard, open, digital or combined digital and analog communication protocols such as the Highway Addressable Remote Transducer (HART®), PROFIBUS®, FOUNDATION™ Fieldbus, WORLDFIP®, Device-Net®, and Controller Area Network (CAN) protocols have been developed to enable smart field devices made by different manufacturers to communicate with one another while performing one or more process control functions.

Control signals are typically provided to field devices via input/output (I/O) cards that convert control signals to a desired format suited for the particular field devices to which the control signals are being provided. In order to improve control system robustness, control systems sometimes employ redundant I/O cards for controlling a field device. In such control systems, operation is switched from a primary I/O card to a back-up I/O card in an event of failure of the primary I/O card. Such redundant I/O card configuration generally allows a process being controlled to continue functioning without any significant interruption when an I/O card fails to operate properly. In some systems, an I/O card controller is configured to switch I/O card operation from the primary I/O card to the back-up I/O card periodically for verification of functionality of the back-up I/O card. I/O card switchover from a primary I/O card to a back-up I/O card (or vice versa) typically results in a short interruption in the control signal provided to the field device. Some field devices respond to the control signal interruption in an undesirable manner. For example, if the field device being controlled is a valve, a valve controller may control the valve to move to an undesired position, potentially disrupting the process.

SUMMARY

In accordance with a first exemplary aspect, a control signal protection device operates in a first or in a second operational mode. In the first operational mode, the control signal protection device stores energy in a power storage element in the control signal protection device. In the second operational mode, the control signal protection device utilizes the stored energy to sustain a control signal at the output of the device in an event of an interruption in the control signal at the input of the device. In one embodiment, the signal protection device includes a switching circuit to control operational mode of the device. In an aspect, the control signal protection device further includes an input current monitoring element that controls the switching circuit. In this respect, the input current monitoring circuit may cause the device to switch from the first operational mode to the second operational mode when input current to the device is below a threshold, and may cause the device to transition from the second operational mode to the first operational mode when the input current is above the threshold. In some embodiments, the control signal protection device includes a voltage monitoring element to monitor a voltage level at the output of the device. In this aspect, when operating in the second operational mode and in the absence of a control signal at the input to the device, the device may maintain output voltage at the voltage level indicated by the voltage monitoring element.

In further accordance with the first exemplary aspect, the control signal protection device may further include, in any combination, any one or more of the following preferred forms.

In one preferred form, the power storing element includes at least one capacitor.

In another preferred form, the power storing element includes a first capacitor and a second capacitor, and electric energy is supplied to the output terminals from the first capacitor and from the second capacitor.

In another preferred form, the switching circuit controls the operational mode in response to variation in input current entering the signal protection device.

In another preferred form, the control signal protection device according further comprises a current monitoring circuit. The current monitoring circuit causes the control signal protection device to transition from the first operational mode to the second operation mode when current entering the signal protection device is below a threshold value, and causes control signal protection device to transition from the second operational mode to the first operational mode when current entering the signal protection device is above the threshold value. In one preferred form, the threshold value is 2 mA.

In another preferred form, the control signal protection device further comprises a voltage maintaining element to maintain a filtered and scaled version of voltage corresponding to a voltage level across the input terminals during the normal operational mode.

In another preferred form, the voltage across the output terminals is maintained at the filtered voltage in the second operational mode.

In another preferred form, the first operational mode is a normal mode in which the control signal is provided at the input terminals, and wherein the second operational mode is a protection mode in which the control signal is not provided at the input terminals.

In accordance with a second exemplary aspect, a method of protecting a control signal provided to a field device in a process control system involves providing a host station and communicatively coupling the host station to a plurality of input output (I/O) cards including a first card and a second card, wherein operation is selectively switched from the first card to the second card. The method also involves providing a control signal from the host station via the first card or the second card to a control signal protection device. The control signal protection device switches from a first operational mode to a second operational mode during a transition of operation from the first card to the second card. In an embodiment, the control signal protection device stores electric energy in a power storing element in the first operational mode, and supplies electric energy stored in the power storing element is to an output terminal of the control signal protection device in the second operational mode.

In further accordance with the first exemplary aspect, the method may further include, in any combination, any one or more of the following preferred forms:

In one preferred from, the control signal protection device stores electric energy in a power storing element in the first operational mode, and supplies electric energy stored in the power storing element is to an output terminal of the control signal protection device in the second operational mode.

In another preferred form, storing electric energy in the power storing element comprises storing energy in a first capacitor and in a second capacitor, and supplying electric energy comprises transferring stored electric energy from the first capacitor and from the second capacitor to the output terminal of the control signal protection device.

In another preferred form, causing the control signal protection device to switch from the first operational mode to the second operational comprises causing the control signal protection device to transition from the first operational mode to the second operation mode when current entering the signal protection device is below a threshold value, and causing the control signal protection device to transition from the first operational mode to the second operational mode when current entering the signal protection device is above the threshold value.

In accordance with a third exemplary aspect, a system for controlling a field device in a process control system comprises a host station and a plurality of input/output (I/O) cards coupled to the host station for providing a control signal to the field device. The plurality of I/O cards includes a primary I/O card and a back-up I/O card. The system also comprises an I/O card controller configured to selectively switch between the primary I/O card and the backup I/O card. A control signal protection device is communicatively coupled to the I/O cards and to the field device, wherein the control signal protection device sustains the control signal at an output of the signal protection device during a switchover operation between the primary card I/O card and the backup I/O card.

In further accordance with the first exemplary aspect, the system may further include, in any combination, any one or more of the following preferred forms.

In one preferred form, the control signal protection device is configured to store electric energy in a power storing element in a first operational mode, and supply electric energy stored in the power storing element to an output terminal of the control signal protection device in a second operational mode.

In another preferred form, the power storing element included at least one capacitor.

In another preferred form, the power storing element includes a first capacitor and a second capacitor, and electric energy is supplied to the output terminal of the control signal protection device from the first capacitor and from the second capacitor.

In another preferred form, the power storing element includes a charge pump.

In another preferred form, the control signal protection device is further configured to monitor current level at an input terminal of the control signal protection device, and switch operation of the control signal protection device from the first operational mode to the second operational mode in response to detecting that the current level is below a threshold value.

In another preferred form, the control signal protection device is provided as an element separate from the field device.

DETAILED DESCRIPTION OF THE DRAWINGS

DETAILED DESCRIPTION

Figure 1:
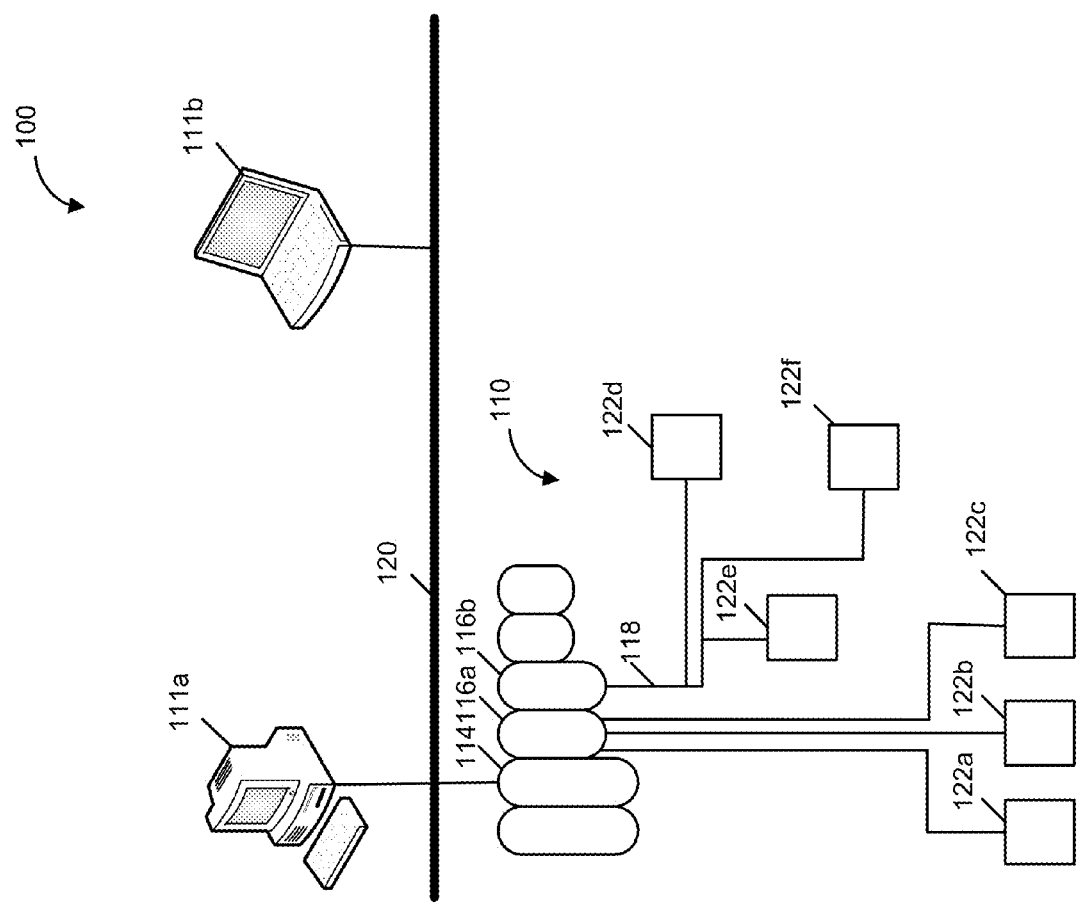
FIG. 1 illustrates a process control system incorporating control signal protection techniques in accordance with a disclosed example of the present invention.

FIG. 1 illustrates a process control system 100 incorporating control signal protection techniques in accordance with the present disclosure, according to an embodiment. The example process control system 100 includes a wired plant automation network 110 that operates according to an industrial automation protocol (e.g., HART, PROFIBUS DP (Decentralized Peripherals), etc.) or another suitable communication protocol. The wired plant automation network 110 includes one or more controllers 114 connected to one or more host stations or computers 111 (which may be any type of personal computer or workstation) and connected to banks of input/output (I/O) devices 116 each of which, in turn, is connected to one or more field devices 122. The controllers 114, which may be, by way of example only, DeltaV™ controllers sold by Fisher-Rosemount Systems, Inc., are communicatively coupled to the host stations 111 via, for example, an Ethernet connection 120 or other communication link. Likewise, the controllers 114 are communicatively coupled to the field devices 122 using any suitable hardware and software associated with, for example, standard 4-20 ma devices and/ or any smart communication protocol such as the Fieldbus or HART protocols. As is generally known, the controllers 114 implement or oversee process control routines stored therein or otherwise associated therewith and communicate with the devices 122 to control a process in any desired manner.

The field devices 122 may be any types of devices, such valves, valve positioners, switches, sensors (e.g., temperature, pressure, vibration, flow rate, or pH sensors), pumps, fans, etc., or combinations of two or more of such types, while the I/O cards within the card bank 116 may be any types of I/O devices conforming to any suitable communication or controller protocol such as HART, Fieldbus, Profibus, etc. Field devices 122 perform control, monitoring, and/or physical functions within a process or process control loop, such as opening or closing valves or taking measurements of process parameters, for example. In the embodiment illustrated in FIG. 1, the field devices 122a-122c are standard 4-20 ma devices that communicate over analog lines to the I/O card 116a. In another embodiment, the field devices 112a-122c are Hart devices and the I/O card 116a is a Hart compatible I/O card. In one embodiment, the control system 100 includes 4-20 ma devices as well as Hart devices. Accordingly, in this embodiment, the control system 100 includes one or more 4-20 ma compatible I/O cards as well as one or more Hart compatible I/O cards.

In the embodiment of FIG. 1, the field devices 122d-122f are smart devices, such as Fieldbus field devices, that communicate over the digital bus 118 to the I/O card 118 using, for example, Fieldbus protocol communications. Of course, the field devices 122 and the banks of I/O cards 116 could conform to any other suitable standard(s) or protocols besides the 4-20 ma, HART or Fieldbus protocols, including any standards or protocols developed in the future.

Each of the controllers 114 is configured to implement a control strategy using what are commonly referred to as function blocks, wherein each function block is a part (e.g., a subroutine) of an overall control routine and operates in conjunction with other function blocks (via communications called links) to implement process control loops within the process control system 100. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 100. Of course hybrid and other types of function blocks exist. Groups of these function blocks are called modules. Function blocks and modules may be stored in and executed by the controller 12, which is typically the case when these function blocks are used for, or are associated with standard 4-20 ma devices and some types of smartfield devices, or may be stored in and implemented by the field devices themselves, which may be the case with Fieldbus devices. While the description of the control system is provided herein using function block control strategy, the control strategy could also be implemented or designed using other conventions, such as ladder logic, sequential flow charts, etc. and using any suitable proprietary or non-proprietary programming language.

Figure 2:
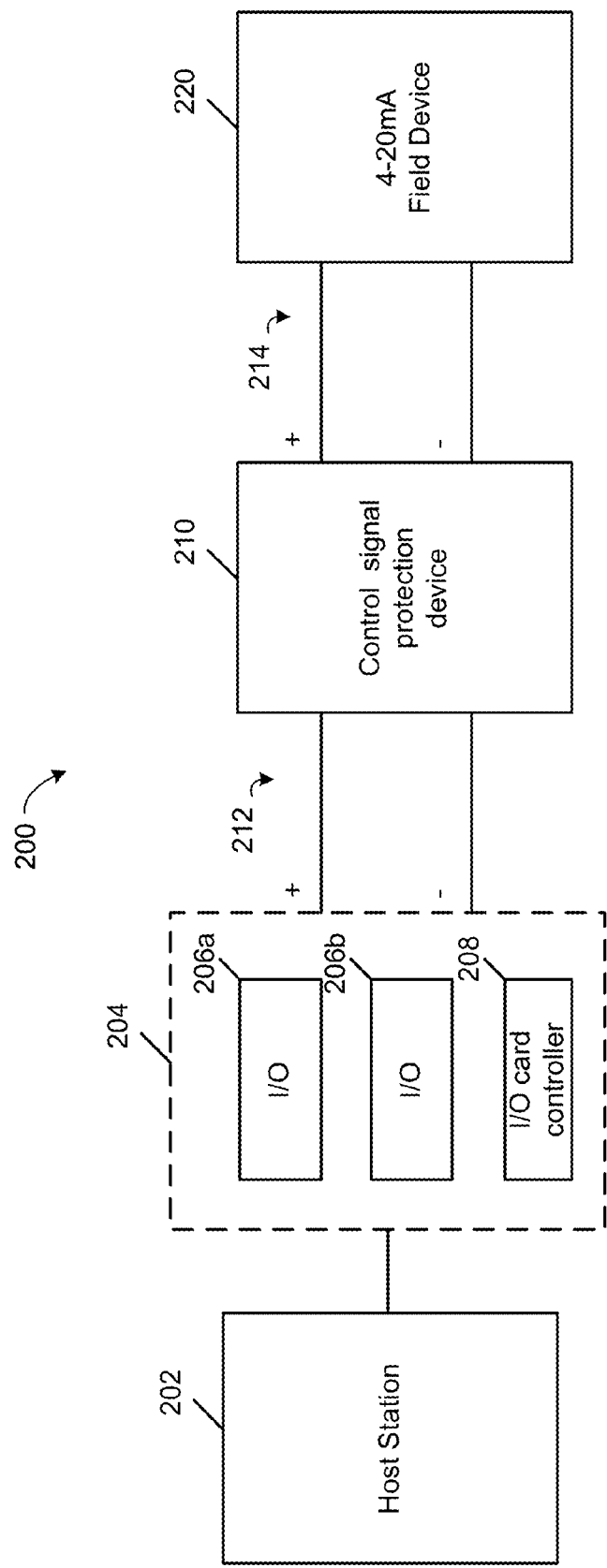
FIG. 2 is a schematic representation of a system in which an interruption ride-through circuit converter may be utilized.

FIG. 2 is a schematic representation of a control system 200 in which a control signal protection device may be utilized to sustain a control signal in case an interruption in the control signal occurs. The control system 200 includes a host station 202 connected to a redundant I/O subsystem 204. Referring to FIG. 1, in an embodiment, the host station 202 corresponds to the host station 111a or the host station 111b, and the I/O subsystem 204 is included in the I/O card bank 116, for example. The output of the I/O subsystem 204 is provided to a field device 220 for controlling operation of the field device 220. The field device 220 may be a suitable 4-20 mA field device, such as a current to pressure transducer or a valve controller, for example, that may accept a control signal in the 4 to 20 mA range and convert the control signal to a pneumatic control signal for controlling the position of a valve.

The I/O subsystem 204 includes a redundant configuration that provides redundant control for the field device 220. In particular, the I/O subsystem includes a first I/O card 206a and a second I/O card 206b. The I/O card 206a may be a primary or active I/O card, while the I/O card 206b may be a back-up I/O card. An I/O card controller 208 may control the operation of the I/O subsystem 204 by automatically switching operation from the primary card 206a to the backup card 206b in an event of failure of the primary card 206a. Additionally, the I/O controller 208 may be configured to switch operation from the primary card 206a to the back-up card 206b periodically in order to verify functionality of the back-up card 206b. Switchover from the primary card 206a to the back-up card 206b, or from the back-up card 206b back to the primary card 206a, in general, may cause an interruption in the control signal present at the output of the I/O subsystem 204. Such interruption in control signal provided to the field device 220 may cause certain undesired effects in the process being controlled. For example, temporary loss of control signal provided to a valve controller may cause the corresponding valve to move to an unintended position, thereby potentially disrupting normal operation of the process being controlled. Further, in some situations, temporary loss of a control signal may cause a valve controller to cause the valve to latch in a safe state, such as in a fully opened or in a fully closed position, for example, or in another predetermined position. For example, the valve controller may be associated with an emergency shutdown valve that, in response to a loss in a control signal, may cause the emergency shutdown valve to latch in a fully closed position to prevent flow of a liquid, for example. In such situations, return to normal operation of the valve may require an operator to manually unlatch the valve.

The system 200 includes a control signal protection device 210 connected in series with the I/O subsystem 204 and the field device 220. As illustrated in FIG. 2, the control signal protection device 210 includes a pair of input terminals 212 and a pair of output terminals 214. The input terminals 212 connect the control signal protection device 210 to a current loop (e.g., 4-20 mA current loop) that provides control signals from the I/O subsystem 204 to the field device 220. The output terminals 214 connect the control signal protection device 210 to control signal current loop terminals of the field device 220. Generally speaking, the control signal protection device 210 is configured to sustain a signal level (e.g., a voltage level) at the output terminals 214 of the control signal protection device 210 for a certain period of time in an event of a loss or temporary interruption of control signal at the input terminals to the control signal protection device 210. To this end, the control signal protection device 210 may include or be coupled to a storage element (e.g., a capacitor) that may store sufficient amount of energy in the storage element during normal operation of the control system 200 and may then utilize the stored energy to sustain the control signal at the output of the device 210 for the duration of a temporary interruption of the control signal at the input to the device 210. As a result, operation of the field device 220 will not be affected by a temporary control signal loss, such as during a switchover operation between the primary card 206a and the backup card 206b. As an example, a control signal provided to a valve via the control signal protection device 210 will be maintained at a sufficient level above a shutdown threshold of the valve being controlled, and, as a result, the valve will not shut down and will need to be reset in the event of a temporary control signal interruption, in an embodiment.

In an embodiment, the control signal protection device 210 operates by extracting a small amount of power from the control signal loop (e.g., 4-20 mA control signal loop) and stores the extracted power in a storage element (e.g., a capacitor) included in or coupled to the signal protection device 210. In a normal mode of operation of the signal protection device 210, when control signal is present at the input of the control protection device 210, the signal protection device 210 presents a filtered version of the control signal at the output of the control protection device 210. Thus, in the normal mode of operation, the control signal device 210 generally passes the control signal from the host station 202 to the field device 220 to control operation of the field device 220. In an embodiment, the signal protection device 210 is configured to pass the control signal from the host station 202 to the field device 220 without heavily filtering of the control signal and, therefore, without a significant delaying the control signal provided to the field device 220. Further, in an embodiment, the control signal protection device 210 is configured to extract a sufficiently small amount of power from the control current loop so as to not disturb operation of the current loop, and to not significantly interfere with communication signals (e.g., HART communication signal) on the current loop, during normal operation of the control system 200.

The control signal protection device 210 is configured to monitor the input current (or voltage) at the input terminals 212 and to detect when the input current (or voltage) at the input terminals 212 falls below a certain threshold, indicating a loss of a control signal from the I/O subsystem 204 at the input of the control signal protection device 210. In response to detecting the loss of control signal at the input of the control signal protection device 210, the control signal protection device 210 is configured to switch operation to a protection mode, in which power stored in the storage element us utilized to sustain a control signal level across the output terminals 214 of the control signal protection device 210. The control signal protection device 210 is also configured to detect when the monitored input current (or voltage) at the input terminals 212 rises above the threshold, indicating that the control signal from the I/O subsystem 204 has been reestablished. When detected that the control signal has returned at the input to the control signal protection device 210, the control signal protection device 210 is configured to switch operation to the normal mode of operation, in which a filtered version of the control signal present at the input terminals 212 of the control signal protection device 210 is transferred to the output terminals 214 of the control signal protection device 210. The control signal protection device 210 may be integrated with the field device 220. For example, the control signal protection device 210 may be integrated into a local control panel provided with a field device to manually operate the field device, such as to manually open or close a safety shutdown valve. As another example, the control signal protection device 210 may be integrated into a HART filter device provided to facilitate HART communication between the field device 220 and the host station 202, for example when the field device 220 is not configured for communication according to the HART communication protocol. Alternatively, the field device 210 may be provided as an external component that may connect serially with a control input to the field device 220. In some embodiments, the control signal protection device 210 may be a multi-channel device capable of providing control signal protection for multiple control inputs of the field device 220 and/or for respective control inputs of multiple field devices.

The control signal device 210 may receive the control signal supplied by the I/O subsystem 204 via a wired connection with the I/O subsystem 204, as illustrated in FIG. 2, or may receive the control signal from a control station wirelessly, for example via a bank of redundant wireless I/O cards. With respect to FIG. 1, the field device 220 corresponds to a 4-20 mA or a HART field device 122, in one embodiment. In another embodiment, the field device 220 corresponds to a 4-20 mA or a HART field device configured for wireless communication with a host station.

Figure 3:
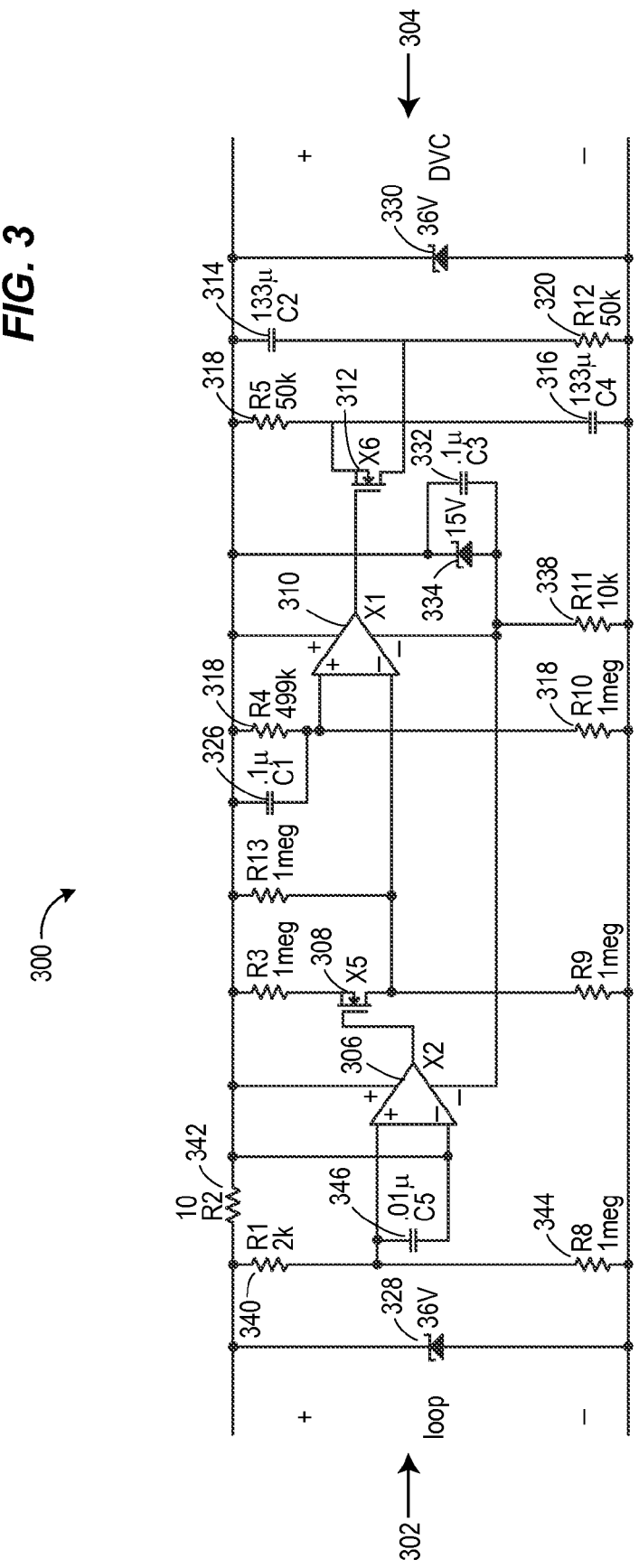
FIG. 3 is an electrical diagram illustrating an interruption ride-through converter in one possible circuit configuration.

FIG. 3 is a diagram illustrating a circuit 300 corresponding to one possible implementation of the control signal protection device 210. The circuit 300 includes a pair of input terminals 302 and a pair of output terminal 304. The input terminals 302 may be communicatively coupled to an output of an I/O card subsystem within a control system. The output terminals 304 may be connected to a field device, such as to a valve controller, for example. The circuit 300 operates by extracting or harvesting a small amount of electric energy generated by the current flowing through the circuit 300 and storing this extracted power in a power storing element within the circuit 300. This stored energy may then be used to maintain a desired voltage level across the output terminal pair 304 in an event of a short interruption of the current entering the circuit 300 at the input terminals 302, such as due to a temporary control signal loss during an I/O card switchover operation. Alternatively, circuits similar to the circuit 300 may operate by using the stored power to supply a desired current (rather than voltage) to the output terminals 304 during an interruption in input current to the circuit 300.

The circuit 300 may include a first switch 308 and a second switch 312. Each of the switches 308 and 312 may be a Metal Oxide Semiconductor Field Effect Transistor (MOSFET), a different type of a transistor, or any other electronic switching means known in the art. A first operational amplifier ("op amp") 306 may be provided to control the operating state of the switch 308, and a second operational amplifier 310 may be provided to control the operating state of the second switch 312. It will be appreciated that discrete transistors may be used as control elements for controlling the operation of the switches 306 and 308 in place of the op amps 306 and 310, in some embodiments.

When current entering the circuit 300 is sufficiently high (e.g., greater than 2 mA), the circuit 300 may operate in a normal operational mode by supplying the current to the output terminals 304. In the normal operational mode, the output of the op amp 306 is sufficiently high to keep the switch 308 in an open state. Consequently, the inputs to the op amp 310 may be such that the op amp 310 operates in a saturated state. As illustrated, the output of the op amp 310 is used to control the state of the switch 312 and the saturated state of the op amp 310 maintains the switch 312 in an open state.

With continued reference to FIG. 3, a capacitor 314 and a capacitor 316 are provided to store power during normal operational mode of the circuit 300 for sustaining output voltage across the output terminals 304 for the duration of a temporary interruption of the control signal provided to the circuit 300. In order to store power in the capacitors 314 and 316 during normal operational mode of the circuit 300 at a sufficiently low rate as to not interfere with the normal operation of the circuit 300, for example to maintain a sufficiently low delay introduced by the circuit 300, or to not interfere with normal communication (e.g., HART communication) on the loop, the rate of storage of energy in the capacitors 314, 316 is controlled by resistors 320 and 318, respectively. As an alternative to the two capacitor configuration used for power storage as illustrated in FIG. 3, in some embodiments, a single capacitor may be used as the power storing element in the circuit 300. Alternatively, other methods of storing power may be utilized. For example, a charge pump or an inductive boost circuit may be provided. In such embodiments, power may be stored at a higher voltage level across the output terminals 304 compared to the voltage level across the input terminals 302 of the circuit 300.

The current entering the circuit 300 may be monitored by a current monitoring circuit for the purpose of controlling the operational mode of the circuit 300. In the embodiment of FIG. 3, the current monitoring circuit comprises a combination of resistors 340, 342 and 344 along with a capacitor 346 coupled across the input terminals of the op amp 306. When the input current entering the circuit 300 falls below a certain threshold (e.g., below 2 mA) the current monitoring circuit causes the circuit 300 to switch operation from the normal operational mode of the circuit 300 to a protection operational mode of the circuit 300. In the protection operational mode, the voltage at the output terminals 304 of the circuit 300 is sustained at a desired level for the duration of the interruption of current entering the circuit 300. Because very little or no current enters the circuit 300, in this operational mode, the voltage difference across the input terminal of the op amp 306 becomes sufficiently small such that the output of the op amp 306 controls switch 308 to transition to a closed state. Closed state of the switch 308, in turn, results in an increase in the voltage level at the negative terminal of the op amp 310 and, accordingly, causes a decrease in a voltage differential across the input terminals of the op amp 310. As a result, the voltage level at the output terminal of the op amp 310 drops, causing the switch 312 to transition to a closed state. In the closed state, the switch 312 effectively connects the negative terminal of the capacitor 314 with the positive terminal of the capacitor 316, and the energy stored in the capacitors 314 and 316 is supplied to the positive side of the output terminal pair 304.

The voltage level maintained across the output terminals 304 of the circuit 300 in the protection operational mode of the circuit 300 is determined by a voltage maintaining element included in the circuit 300, such as a voltage divider formed by a resistor 322 and a resistor 324. Further, capacitor 326 is filters the voltage presented across the output terminals 304. Thus, when the circuit 300 transitions from the normal operational mode to the protection operational mode, the voltage across the output terminals 304 of the circuit 300 is sustained at a scaled and filtered voltage level at the positive terminal of the capacitor 326. Accordingly, the voltage drop across the output terminal 304 corresponds to the voltage level across the terminals 304 prior to the input current interruption (i.e., in the normal operational mode). As a result, voltage across the output terminals 304 does not experience a significant change during a control signal interruption at the input terminals 302 of the circuit 300.

Subsequently, when control signal is returned to the circuit 300, such as upon completion of switchover from the primary card I/O card 206a to the back-up I/O card 206b in the I/O subsystem 204 (FIG. 2), electric current at the input terminals 302 of the circuit 300 increases and crosses the threshold value determined by the current monitoring element of the circuit 300. When input current is above the threshold level (e.g., above 2 mA), op amps 306 and 310 control respective switches 308 and 312 to transition to an open state. Accordingly, in this case, the circuit 300 returns to the normal operational mode.

In some embodiments, the circuit 300 includes additional components to improve performance of the circuit 300 and/or increase robustness of the circuit 300 in presence of transient noise or interference in the circuit 300. For example, the implementation of the circuit 300 illustrated in FIG. 3 includes zener diodes 328, 330 connected across the input terminals 302 and across the output terminals 304, respectively, of the circuit 300. The zener diodes 328, 330 are provided for protection of the circuit 300 against transient interference at the input and the output of the circuit 300. A capacitor 332 may be provided to filter the voltage supplied to the op amps 306 and 310 to improve performance of the op amps 306 and 310. Further, a zener diode 334 and a resistor 338 may be used to supply desired voltage limited power to the op amps 306 and 310. To this end, the zener diode 334 and the resistor 338 may be selected in accordance with the maximum voltage specified for the particular op amps 306 and 310 being utilized. It should be noted that such additional components may not necessary for proper operation of the circuit 300 and at least some of the additional components are omitted from the circuit 300 in some implementations.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A control signal protection device having a first operational mode and a second operational mode, comprising:
    a first terminal pair that connects the signal protection device to a control system, wherein the control system provides a control signal to a field device according to an industrial automation protocol;
    a second terminal pair that connects to the field device to provide the control signal;
    an element to control a rate of accumulating energy in the power storing element; and
    a power storing element for temporary accumulation of electric energy;
    a switching circuit for controlling the operational mode of the signal protection device, wherein
        electric energy is stored in the power storing element in the first operational mode without interfering with communicating the control signal from the control system; and
        electric energy stored in the power storing element is supplied to a positive terminal in the second terminal pair in the second operational mode.

2. The control signal protection device according to claim 1, wherein the power storing element includes at least one capacitor.

3. The control signal protection device according to claim 1, wherein the power storing element includes a first capacitor and a second capacitor, and wherein electric energy is supplied to the output terminals from the first capacitor and from the second capacitor.

4. The control signal protection device according to claim 1, wherein the switching circuit controls the operational mode in response to variation in input current entering the signal protection device.

5. The control signal protection device according to claim 1, further comprising a current monitoring circuit, wherein the current monitoring circuit:
    causes the control signal protection device to transition from the first operational mode to the second operation mode when current entering the signal protection device is below a threshold value; and
    causes control signal protection device to transition from the second operational mode to the first operational mode when current entering the signal protection device is above the threshold value.

6. The control signal protection device according to claim 5, wherein the threshold value is 2 mA.

7. The control signal protection device according to claim 1, further comprising a voltage maintaining element to maintain a filtered and scaled version of voltage corresponding to a voltage level across the input terminals during the first operational mode.

8. The control signal protection device according to claim 7, wherein voltage across the output terminals is maintained at the filtered voltage in the second operational mode.

9. The control signal protection device according to claim 1, wherein the first operational mode is a normal mode in which the control signal is provided at the first terminal pair defining input terminals, and wherein the second operational mode is a protection mode in which the control signal is not provided at the input terminals.

10. A method of protecting a control signal provided to a field device in a process control system, the method comprising:
   providing a host station;
   communicatively coupling the host station to a plurality of input output (I/O) cards including a first card and a second card, wherein operation is selectively switched from the first card to the second card;
   providing a control signal from the host station via the first card or the second card to a control signal protection device;
   causing the control signal protection device to switch from a first operational mode to a second operational mode during a transition of operation from the first card to the second card, wherein the control signal protection device:
      stores electric energy in a power storing element in the first operational mode, and
      supplies electric energy stored in the power storing element to an output terminal of the control signal protection device in the second operational mode.

11. The method according to claim 10, wherein storing electric energy in the power storing element comprises storing energy in a first capacitor and in a second capacitor, and wherein supplying electric energy comprises transferring stored electric energy from the first capacitor and from the second capacitor to the output terminal of the control signal protection device.

12. The method according to claim 10, wherein causing the control signal protection device to switch from the first operational mode to the second operational comprises:
   causing the control signal protection device to transition from the first operational mode to the second operation mode when current entering the signal protection device is below a threshold value; and
   causing the control signal protection device to transition from the first operational mode to the second operational mode when current entering the signal protection device is above the threshold value.

13. A control system for controlling a field device in a process control system, comprising:
   a host station;
   a plurality of input/output (I/O) cards coupled to the host station for providing a control signal to the field device, wherein the plurality of I/O cards includes a primary I/O card and a back-up I/O card;
   an I/O card controller configured to selectively switch between the primary I/O card and the backup I/O card; and
   a control signal protection device communicatively coupled to the I/O cards and to the field device, wherein the control signal protection device is configured to store electric energy in a power storing element in a first operational mode and supply electric energy stored in the power storing element to an output terminal of the control signal protection device in a second operational mode to sustain the control signal at an output of the signal protection device during a switchover operation between the primary card I/O card and the backup I/O card.

14. The control system according to claim 13, wherein the power storing element included at least one capacitor.

15. The control system according to claim 13, wherein the power storing element includes a first capacitor and a second capacitor, and wherein electric energy is supplied to the output terminal of the control signal protection device from the first capacitor and from the second capacitor.

16. The control system according to claim 13, wherein the power storing element includes a charge pump.

17. The control system of claim 13, wherein the control signal protection device is further configured to:
   monitor current level at an input terminal of the control signal protection device; and
   switch operation of the control signal protection device from the first operational mode to the second operational mode in response to detecting that the current level is below a threshold value.

18. The control system of claim 13, wherein the control signal protection device is provided as an element separate from the field device.

* * * * *